(12) United States Patent
Patterson et al.

(10) Patent No.: US 8,186,893 B1
(45) Date of Patent: May 29, 2012

(54) MOUNT FOR MOUNTING DEVICES AND HAVING AN ADJUSTABLE ROTARY DETENT ASSEMBLY

(75) Inventors: Gregory Scott Patterson, Morrisville, NC (US); William Kevin Carpenter, Warrensville, NC (US)

(73) Assignee: Porticos, Inc., Morrisville, NC (US)

( * ) Notice: Subject to any disclaimer, the term of this patent is extended or adjusted under 35 U.S.C. 154(b) by 0 days.

(21) Appl. No.: 12/911,255

(22) Filed: Oct. 25, 2010

Related U.S. Application Data

(60) Provisional application No. 61/281,709, filed on Nov. 20, 2009.

(51) Int. Cl.
  *G03B 17/00* (2006.01)
(52) U.S. Cl. ........................................................ 396/428

(58) Field of Classification Search ................... 396/428
  See application file for complete search history.

(56) References Cited

U.S. PATENT DOCUMENTS

| | | | | |
|---|---|---|---|---|
| 5,109,411 | A  * | 4/1992 | O'Connell | 379/454 |
| 6,991,384 | B1 * | 1/2006 | Davis | 396/428 |
| 7,380,996 | B2 * | 6/2008 | Kouchi et al. | 396/424 |
| 2010/0310250 | A1 * | 12/2010 | McAnulty | 396/428 |

* cited by examiner

*Primary Examiner* — W. B. Perkey
(74) *Attorney, Agent, or Firm* — Coats & Bennett, P.L.L.C.

(57) ABSTRACT

A mount is provided for being secured to a support structure and which is configured to receive and support a device such as a camera. The mount includes a series of brackets and one or more rotary detent assemblies that interconnect one bracket to another. Furthermore, the mount provides a rotary detent assembly that enables the detent assembly to be angularly adjusted relative to one of the brackets that forms a part of the mount.

13 Claims, 7 Drawing Sheets

MOUNT FOR MOUNTING DEVICES AND HAVING AN ADJUSTABLE ROTARY DETENT ASSEMBLY

CROSS REFERENCE TO RELATED APPLICATION

This application claims priority under 35 U.S.C. §119(e) from the following U.S. provisional application: Application Ser. No. 61/281,709 filed on Nov. 20, 2009. That application is incorporated in its entirety by reference herein.

BACKGROUND OF THE INVENTION

This invention, in one embodiment, deals generally with vehicle mounted cameras such as those found in police vehicles.

While predominately stationary, there are situations where it is desirable to adjust the camera position in any combination of azimuth or longitudinal directions. Ideally this function should be able to be performed with a single hand/operation and the swivel apparatus should provide some type of feedback to the user once the camera is returned to the original home position.

Current camera mounts do not provide these advantages. Typically they provide a fully stationary configuration such as what would be expected by hard mounting a solid bracket to the interior of the vehicle and then mounting the camera to that bracket. Alternately, existing "adjustable" mounting brackets require tools (IE screws or bolts that travel within slots on the bracket) or multiple hand/step operation (IE thumb screws that can be loosened to free movement about a shaft). There are currently no solutions available that provide a home detent function, much less in conjunction with single hand/operation adjustment.

SUMMARY OF THE INVENTION

The present invention relates to a mount for mounting a device to a structure. The mount includes a first bracket configured to be secured to a structure. A device mounting bracket is connected to the first bracket and functions to receive and hold a device such as a camera. There is provided an adjustable rotary detent assembly operatively interconnected between the first bracket and the device mounting bracket.

In one embodiment the adjustable rotary detent assembly includes a cam having a detent projecting therefrom and a detent bushing extending around the cam and including a notch for receiving the detent. A pin extends through the cam and fixes the cam relative to the detent bushing such that the detent bushing can rotate around the cam and wherein, during each revolution of the detent bushing the detent of the cam moves into the notch of the detent bushing. A locking mechanism is provided for locking the detent bushing to the first bracket or the device mounting bracket such that movement of the first bracket or detent mounting bracket results in the detent bushing rotating with the first bracket or the device mounting bracket. The locking mechanism is operative to disengage and permit the first bracket or the device mounting bracket to rotate relative to the detent bushing after which the locking mechanism can be reengaged thereby permitting the first bracket or the device mounting bracket to be adjusted angularly with respect to the detent bushing and the notch therein.

Other objects and advantages of the present invention will become apparent and obvious from a study of the following description and the accompanying drawings which are merely illustrative of such invention.

DESCRIPTION OF EXEMPLARY EMBODIMENT

Figure 1:
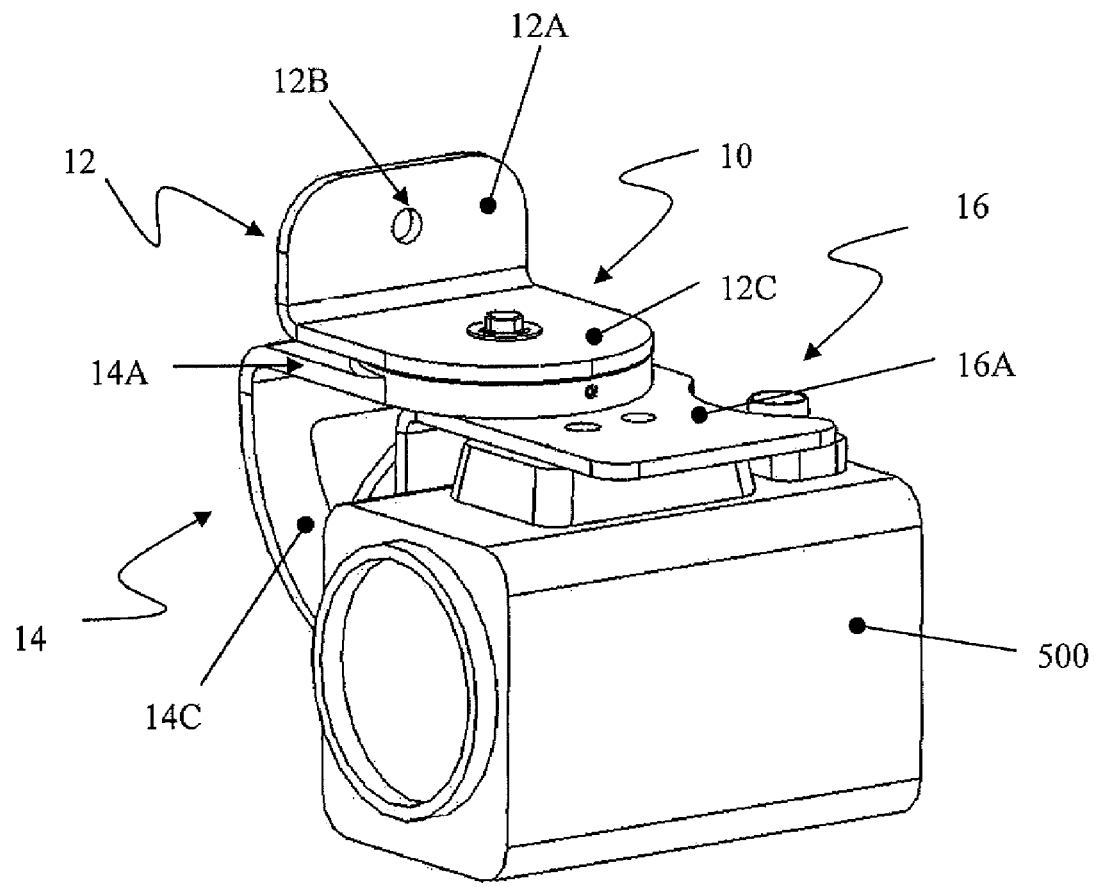
FIG. 1 is a perspective view of the mount of the present invention showing a camera secured to the mount.
Figure 2:
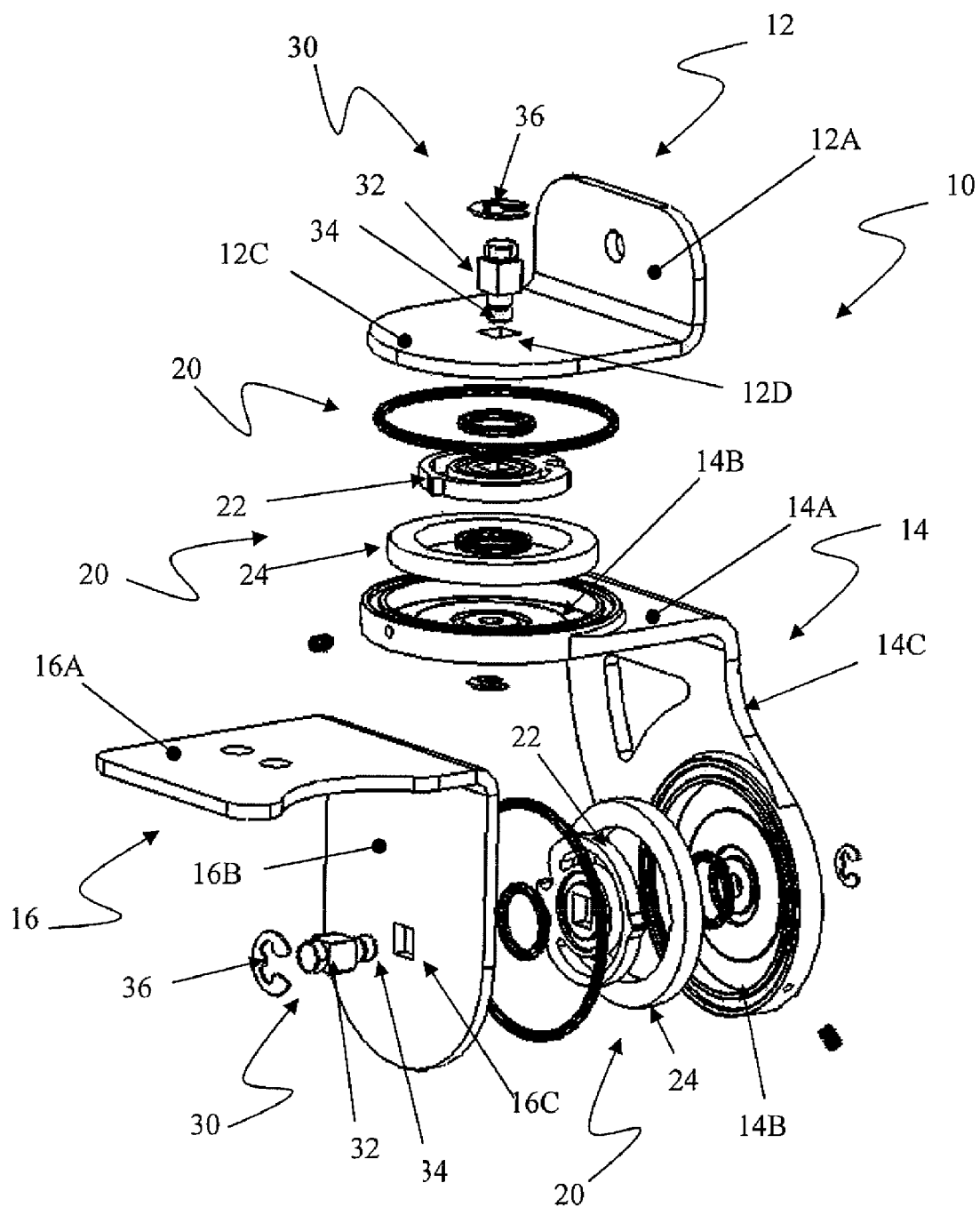
FIG. 2 is an exploded view of the mount.
Figure 3:
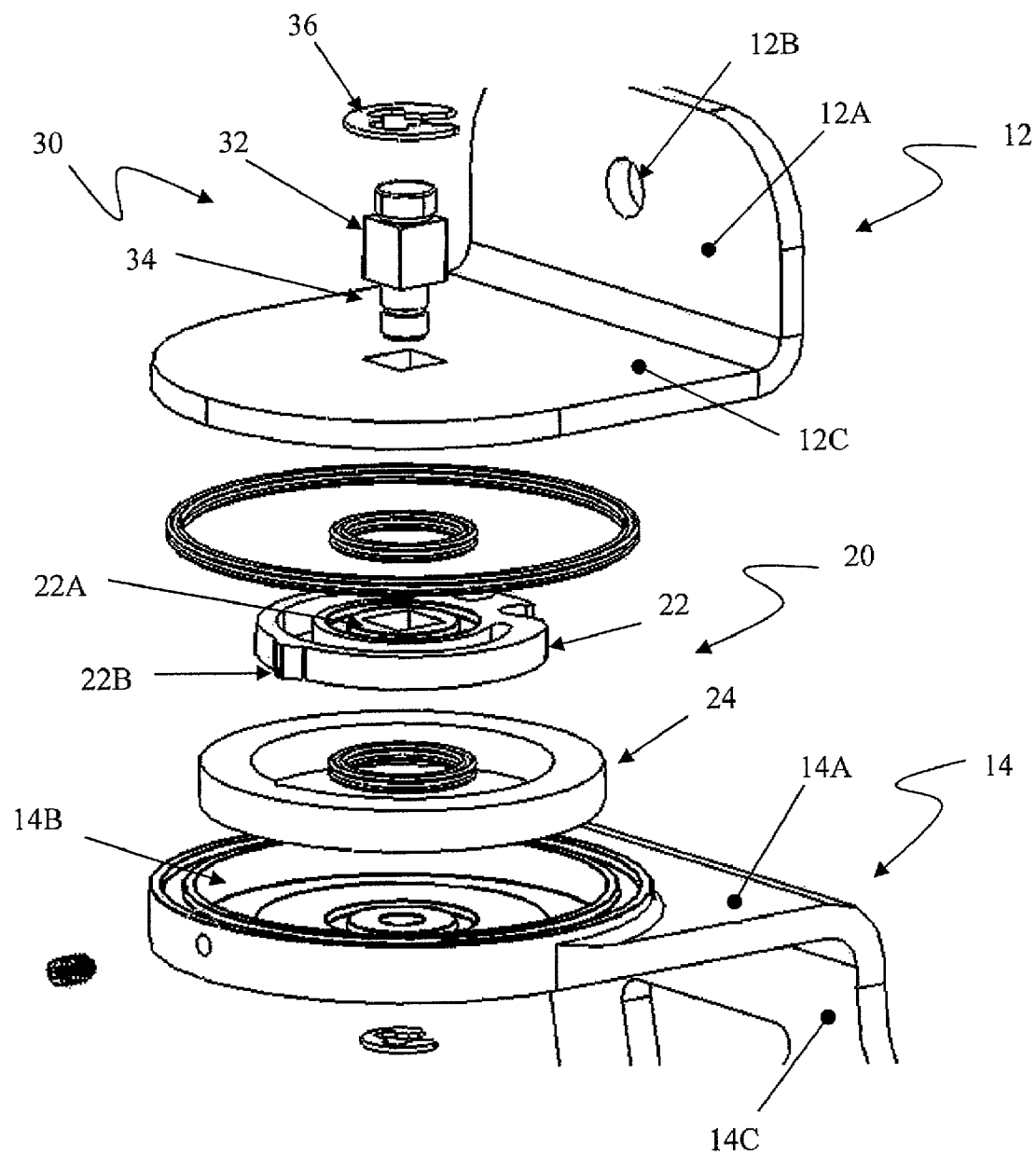
FIG. 3 is an enlarged exploded view of a portion of the mount.
Figure 4:
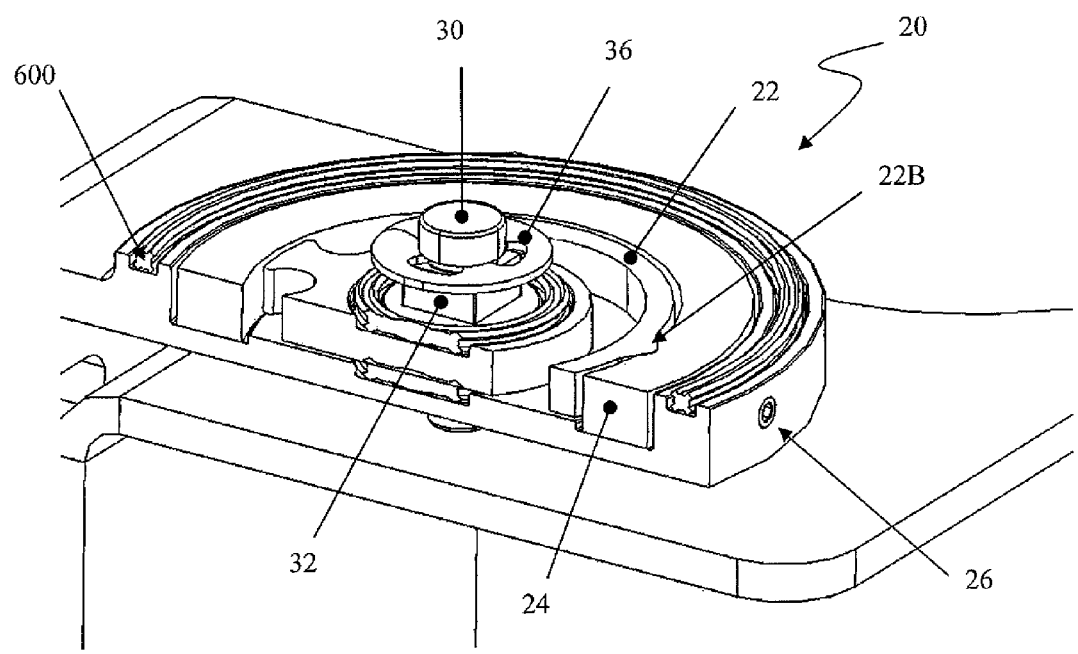
FIG. 4 is a fragmentary sectional view showing portions of the rotary detent assembly.

With further reference to the drawings, the mount of the present invention is shown therein and indicated by the number 10. Mount 10 is designed to be secured to a structure and adapted or configured to have mounted thereto a device such as a camera. As will be explained subsequently herein, the mount 10 is for use in a vehicle to support a camera. In such case the mount 10 is secured to the vehicle and there is a camera mounted to the mount. As will be described later, the device or camera can be moved through an infinite number of positions. In addition, the mount itself can be moved or adjusted through any number of positions. One of the features of the present invention is that the mount includes one or more detent assemblies where the detent assembly includes a detent that defines a home or set position. The position of the detent can be effectively adjusted with respect to the mount 10.

Turning now specifically to the drawings, the mount 10 comprises a first bracket or a mounting bracket indicated generally by the numeral 12. Mounting bracket 12 is designed to be mounted or secured to various support structures.

Rotatively mounted to the mounting bracket 12 is what is referred to as an intermediate bracket, indicated generally by the numeral 14. As will be discussed subsequently herein, the intermediate bracket 14 is rotatively mounted to the mounting bracket 12 and can be rotatively adjusted with respect to the mounting bracket.

There is also provided a device mounting bracket which is indicated generally by the numeral 16. Device mounting bracket 16 is rotatively mounted to the intermediate bracket 14 such that the device mounting bracket can be rotatively adjusted with respect to the intermediate bracket 14.

Mounting bracket 12 includes an upper flange 12A that includes an opening 12B. Further, mounting bracket 12 includes a base 12C that includes a square opening 12D. Opening 12B enables the mounting bracket 12 to be secured to a support structure. Other geometries or mounting configurations could be envisioned without impacting the overall function and spirit of the design.

Intermediate bracket 14 includes an upper horizontal flange 14A. There is a cavity or seat area 14B provided in the intermediate bracket 14. Further, the intermediate bracket 14 includes a lower flange 14C that includes a portion that is at least slightly offset with respect to the upper horizontal flange 14A. In the particular embodiment shown in the drawings, the lower flange 14C also includes a cavity or seat area 14B formed therein.

Device mounting bracket 16 includes an upper flange 16A that includes one or more openings that are utilized to mount a device to the upper flange. Further, device mounting bracket 16 includes a lower flange 16B with a square opening 16C formed therein.

Mount 10 includes one or more rotary detent assemblies. In the case of the embodiment illustrated herein, the mount 10 includes two rotary detent assemblies. Each rotary detent assembly is indicated generally by the numeral 20. As seen in the drawings, there is a rotary detent assembly 20 operatively interconnected between the intermediate bracket 14 and the mounting bracket 12. There is also a rotary detent assembly 20 operative interconnected between the intermediate bracket 14 and the device mounting bracket 16. In each case, the rotary detent assembly 20 includes portions that are seated within the cavities 14B of the intermediate bracket 14. In each case, the rotary detent assembly 20 is generally sandwiched between the cavity 14B and a planar surface of one or the other brackets 12 or 16.

With respect to the structure and function of each rotary detent assembly 20, the same comprises a cam 22 that is seated in a respective cavity 14B. Cam 22 includes a square opening 22A and a detent or protrusions 22B. Note that the cam 22 is generally circular and wherein the detent 22B projects outwardly from an outer surface thereof. While the cam 22 can be constructed of various materials, in one embodiment the cam is constructed of Delrin that enables the cam to inherently possess a spring force. That is, the spring force associated with the cam 22 arises due to the geometry of the cam and due to the material that makes up the cam. More particularly, as will be appreciated from the subsequent portions of the disclosure, the geometry of the cam along with the material that makes up the cam is specifically designed to provide an adequate force to yield a tactile feedback when the device mounting bracket 16 or mounting bracket 12 are brought to a home position.

Figure 7:
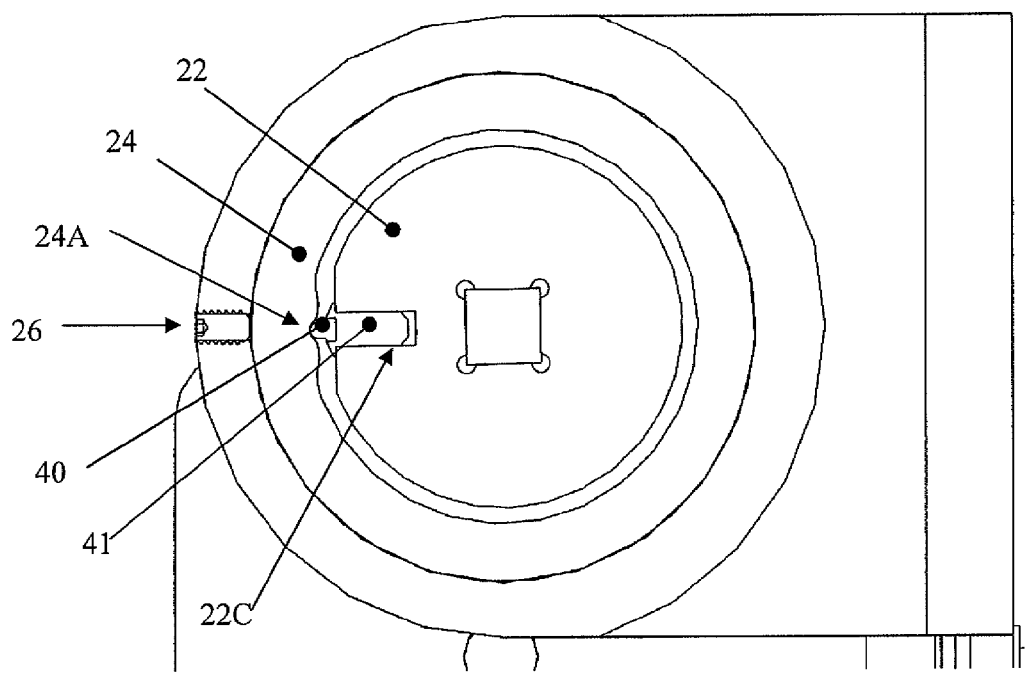
FIG. 7 is a fragmentary sectional view showing the use of a dedicated spring and ball plunger to create the cam detent feature.

FIG. 7 illustrates another embodiment were a ball plunger 40 provides the detent feature in place of the protrusion 22B. In this case, ball plunger 40 is urged into notch 24A via a dedicated compression spring 41. Both the ball plunger 40 and the compression spring 41 are located in a cavity 22C provided in cam 22 specifically for this purpose.

Surrounding the cam 22 is a detent bushing 24 that is seated in the cavity 14B. Detent bushing 24 extends around the outer surface of the cam 22. Formed in an inner surface of the detent bushing 24 is a notch 24A. The function of the notch is to receive the detent 22B that projects from the cam 22. When the detent 22B is seated or projects into the notch 24A, the rotary detent assembly 20 is said to be in the home position.

There is provided a locking mechanism for locking the detent bushing 24 to the supporting bracket. In this case, the detent bushing 24 for each rotary detent assembly 20 is seated within one of the cavities 14B formed in the intermediate bracket 14. The locking mechanism disclosed in the drawings includes a set screw 26 that is located in a surrounding wall of the cavity 14B. By screwing the set screw 26 inwardly and engaging an outer surface of the detent bushing 24, the detent bushing is locked with the intermediate bracket 14 and as the intermediate bracket 14 is rotated or moved, the detent bushing is constrained to move with the bracket.

Each rotary detent assembly 20 includes a connecting pin indicated generally by the numeral 30. Each connecting pin 30 includes a square section 32 and a round section 34. There is provided a retaining clip 36 for securing the connecting pin 30 in place. When the connecting pin 30 is inserted and forms a part of one of the rotary detent assemblies, the connecting pin 30 is effective to fix the cam 22 such that the cam remains stationary with respect to the pin 30. However, as shown in the drawings, when the pin 30 is properly assembled and forms a part of one of the rotary detent assemblies, the detent bushing 24 and the intermediate bracket 14 can rotate about pin 30.

Figure 6:
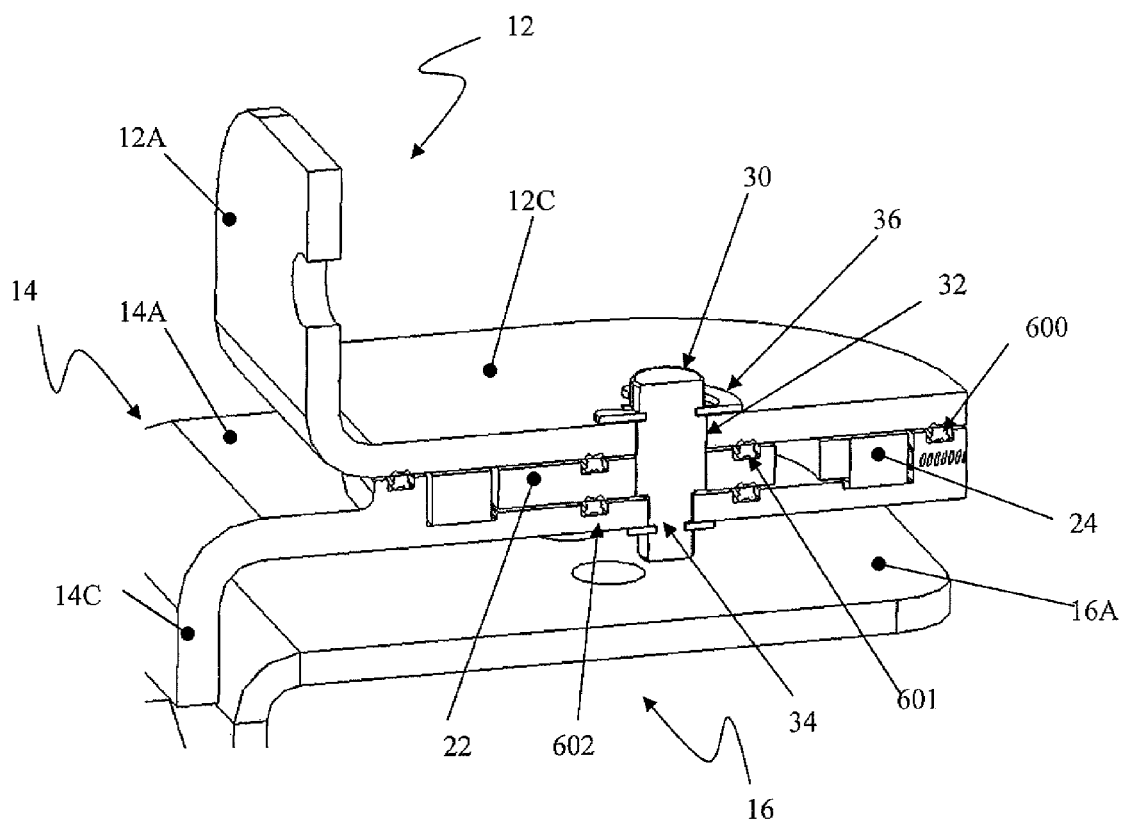
FIG. 6 is a fragmentary sectional view showing the various O rings that form a part of the rotary detent assembly.

Each rotary detent assembly 20 includes a series of O-rings, 600, 601 and 602. The O-rings 600, 601 and 602 are used to prevent lubricant grease from coming out of the rotary detent assembly. FIG. 6 illustrates the details of the interface between the O-rings and various surfaces of the mount 10. The relatively large O-ring 600 seats in the cavity 14B that is machined into intermediate bracket 14 at an appropriate depth. This O-ring then seals between the bracket 14 and the mounting bracket 12. O-ring 601 seats in a slot machined into the cam 22 at an appropriate depth. This O-ring sits between the cam 22 and the mounting bracket 12 to prevent grease from leaking through the gap between pin 30 and the square hole 12D in the mounting bracket 12. Likewise, an identical O-ring 602 sets in another slot machined into bracket 14 at the appropriate depth. This O-ring seals between the cam 22 and the bracket 14 to prevent grease or lubricant from leaking through the gap between the pin 30 and the round hole in bracket 14. The O-ring details can be changed without impacting the fundamental functionality of the mount 10 provided that the O-rings maintain a good seal. Alternatively, there can be situations or applications where grease is not required and hence O-rings would not be required.

As discussed above, various devices can be mounted to the device mounting bracket 16. In the drawings, a camera 500 is mounted to the device mounting bracket 16. It is understood and appreciated by those skilled in the art that other devices can be mounted to the device mounting bracket 16 and that the mount 10 can be mounted to various structures.

Figure 5:
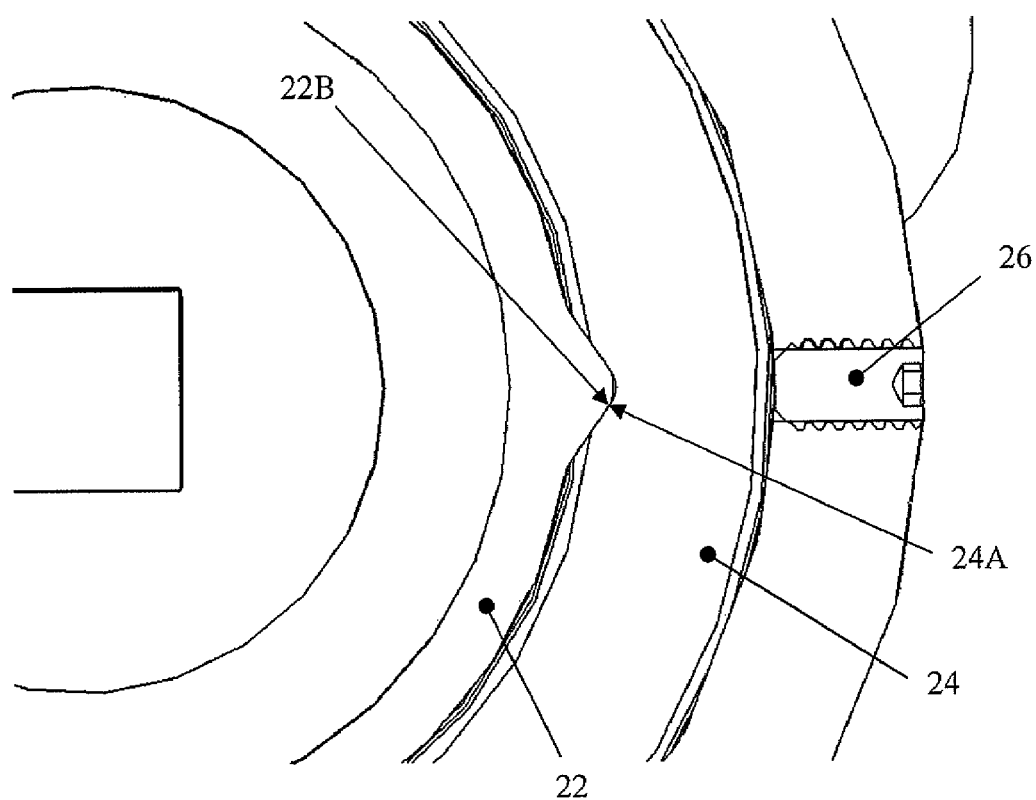
FIG. 5 is a schematic illustration showing the detent of the cam projecting into a notch formed in the detent bushing.

It should be noted that the spring force needed to adequately seat the detent 22B into the notch 24A is provided by the cam 22 as a result of the geometry of the cam. That geometry, as discussed above, has been specifically designed taking into consideration the type of material utilized in the cam, which in one exemplary embodiment is Delrin. The geometry and cam material provides an adequate force to give tactile feedback when the camera is returned to the home position, but is not so strong as to prevent the user from defeating the passive engagement when it is desired to re-orient the device or camera. To further facilitate this action, the detent 22B has an angled surface similar to the angled surface of notch 24A as seen in the cross-section of FIG. 5. Those angled surfaces act as a ramp to force the detent 22B out of the notch 24A against the spring geometry of the cam 22 when a respective bracket is rotated.

To adjust the home position of the detent bushing 24, the user would first rotate the intermediate bracket 14 until the cam 22 seated in the notch 24A. This will provide a tactical feedback to the user that the orientation is at the home position. Then the set screw 26 is loosened to allow the bracket having the set screw associated therewith to rotate with respect to the detent bushing 24. The intermediate bracket 14 can now be repositioned as desired. In this example, the detent bushing 24 will remain stationary with respect to the cam 22 as well as to the mounting bracket 12. Once the new location is selected, the set screw 26 is tightened which will lock the detent bushing 24 once more to the intermediate bracket 14. This is now the new home position.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A mount for mounting to a structure and for holding a device, comprising:
   a. a mounting bracket for mounting the mount to a structure;
   b. an intermediate bracket;
   c. a first rotary detent assembly operatively interconnecting the mounting bracket and the intermediate bracket for permitting the intermediate bracket to rotate with respect to the mounting bracket;
   d. the first rotary detent assembly including a detent for stationing the intermediate bracket in a first position with respect to the mounting bracket;
   e. the detent associated with the first rotary detent assembly being angularly adjustable such that the detent of the first rotary detent assembly can be positioned at various locations around the first rotary detent assembly;
   f. a device mounting bracket for receiving and supporting the device;
   g. a second rotary detent assembly operatively interconnecting the device mounting bracket with the intermediate bracket for permitting the device mounting bracket to rotate relative to the intermediate bracket;
   h. the second rotary detent assembly including a detent for stationing the device mounting bracket in a first position with respect to the intermediate bracket; and
   i. the detent associated with a second rotary detent assembly being angularly adjustable such that the detent of the second rotary detent assembly can be positioned at various locations around the second rotary detent assembly.

2. The mount of claim 1 wherein each rotary detent assembly comprises:
   j. a cam having the detent disposed on an outer surface thereof;
   k. a detent bushing having a notch for receiving the detent; and
   l. an adjustment mechanism for adjusting the angular position of the detent bushing with respect to at least one of the brackets.

3. The mount of claim 2 wherein the detent bushing of each rotary detent assembly is disposed on the intermediate bracket, and wherein the adjustment mechanism of each rotary detent assembly is operative to adjust the angular position of the detent bushing of a respective rotary detent assembly with respect to the intermediate bracket.

4. The mount of claim 3 wherein the adjustment mechanism of each rotary detent assembly includes a set screw threaded into a portion of the intermediate bracket adjacent one or the detent bushings, and wherein in an operative mode the set screw engages the detent bushings and effectively locks the detent bushing to the intermediate bracket, and in an adjustment mode the set screw disengages the detent bushing and permits the intermediate bracket to be rotated with respect to the detent bushing.

5. The mount of claim 2 wherein the cam produces a spring action that urges the detent into the notch of the detent bushing, and wherein the cam includes a selected geometry and is constructed of a selected material such that the selected geometry and selected material give rise to the spring action that urges the detent into the notch of the detent bushing.

6. The mount of claim 1 wherein the detent of each detent assembly comprises a spring-loaded spherical member.

7. The mount of claim 1 wherein each rotary detent assembly comprises:
   m. a cam having a detent disposed on an outer portion thereof;
   n. a generally round detent bushing surrounding the cam and including a notch disposed on an inner portion thereof for receiving the detent;
   o. the detent bushing being seated in at least one of the brackets;
   p. a pin interconnecting the intermediate bracket to the mounting bracket or the device mounting bracket; and
   q. the pin extending through the cam and detent bushing and wherein the cam is maintained stationary relative to the pin and wherein the detent bushing is rotatable about the pen.

8. The mount of claim 6 wherein the first rotary detent assembly rotatably interconnects the mounting bracket and intermediate bracket; and wherein the second rotary detent assembly rotatably interconnects the intermediate bracket and the device mounting bracket, and wherein the detent bushing of each rotary detent assembly is seated in an area on the intermediate bracket.

9. The mount of claim 1 wherein the intermediate bracket is generally L-shaped and includes an upper flange and a lower flange; the device mounting bracket is generally L-shaped and includes an upper flange and a lower flange; and wherein the second rotary detent assembly connects to the lower flange of the intermediate bracket to the lower flange of the device mounting bracket; and wherein the mounting bracket is connected to the upper flange of the intermediate bracket by the first rotary detent assembly.

10. The mount of claim 9 wherein each rotary detent assembly comprises:
   r. a cam having a detent disposed on an outer portion thereof;
   s. a generally round detent bushing surrounding the cam and including a notch disposed on an inner portion thereof for receiving the detent;
   t. the detent bushing being seated in at least one of the brackets;
   u. a pin interconnecting the intermediate bracket to the mounting bracket or the device mounting bracket; and
   v. the pin extending through the cam and detent bushing and wherein the cam is maintained stationary relative to the pin and wherein the detent bushing is rotatable about the pin.

11. The mount of claim 1 further including a camera connected to the device mounting bracket.

12. The mount of claim 6 wherein each detent assembly includes a notch for receiving the spherical member.

13. The mount of claim 12 wherein the spring-loaded spherical member includes a ball plunger that is urged outwardly by a compression spring that forms a part of each detent assembly.

* * * * *